(12) United States Patent
Vance et al.

(10) Patent No.: US 12,012,220 B2
(45) Date of Patent: Jun. 18, 2024

(54) CALIBRATION SYSTEM AND METHOD FOR AIRCRAFT CONTROL SURFACE ACTUATION

(71) Applicant: The Boeing Company, Chicago, IL (US)

(72) Inventors: Jonathan B. Vance, Webster Groves, MO (US); Andrew J. Martignoni, III, Collinsville, IL (US)

(73) Assignee: The Boeing Company, Chicago, IL (US)

( * ) Notice: Subject to any disclaimer, the term of this patent is extended or adjusted under 35 U.S.C. 154(b) by 173 days.

(21) Appl. No.: 17/449,044

(22) Filed: Sep. 27, 2021

(65) Prior Publication Data

US 2022/0250765 A1    Aug. 11, 2022

Related U.S. Application Data

(60) Provisional application No. 63/148,298, filed on Feb. 11, 2021.

(51) Int. Cl.
| | |
|---|---|
| *B64D 45/00* | (2006.01) |
| *B64C 9/00* | (2006.01) |
| *B64F 5/60* | (2017.01) |

(52) U.S. Cl.
CPC ............ *B64D 45/0005* (2013.01); *B64C 9/00* (2013.01); *B64F 5/60* (2017.01)

(58) Field of Classification Search
CPC .......... B64D 45/0005; B64C 9/00; B64F 5/60
See application file for complete search history.

(56) References Cited

FOREIGN PATENT DOCUMENTS

| CN | 109356727 A | | 2/2019 | |
|---|---|---|---|---|
| CN | 110667886 | * | 9/2019 | ............... B64F 5/60 |
| CN | 110667886 A | | 1/2020 | |
| EP | 3 730 902 A1 | | 10/2020 | |

OTHER PUBLICATIONS

Extended European Search Report dated Apr. 21, 2022 in the corresponding European Application No. 21204668.4, 11 pages.

* cited by examiner

*Primary Examiner* — Hongmin Fan
(74) *Attorney, Agent, or Firm* — Quinn IP Law

(57) ABSTRACT

A calibration system for aircraft control surface actuation includes an inclinometer coupleable to an aircraft control surface. The inclinometer is configured to provide measurement data of an inclination value corresponding to an angle at which the surface is deflected. The system includes an adapter with a wireless transmitter module and an interface connector connected to the inclinometer. The adapter is configured to receive and wirelessly transmit the measurement data. The system includes a wireless receiver device and a computing device connected thereto to receive the measurement data. The computing device is configured to determine if the inclination value differs by more than a predetermined amount from a directed deflection angle for the surface. The computing device is also configured to communicate an adjustment amount to a controller configured to direct deflection of the surface, based on the difference between the measured inclination value and the directed deflection angle.

22 Claims, 6 Drawing Sheets

CALIBRATION SYSTEM AND METHOD FOR AIRCRAFT CONTROL SURFACE ACTUATION

CROSS-REFERENCE TO RELATED APPLICATION(S)

This application claims priority to U.S. Provisional Application No. 63/148,298, filed Feb. 11, 2021, entitled CALIBRATION SYSTEM AND METHOD FOR AIRCRAFT CONTROL SURFACE ACTUATION, the content of which is incorporated herein by reference in its entirety.

TECHNOLOGICAL FIELD

The present disclosure relates generally to the measurement and adjustment of surfaces at specific angles and, in particular, to closed-loop calibration for aircraft control surfaces.

BACKGROUND

Measuring the angles of control surfaces on an aircraft is a part of routing maintenance that conventionally requires placing protractors on the control surfaces to determine the true angle of the control surface when actuated. A mechanic or other personnel may sit or otherwise be physically located on the aircraft near the control surface to report the true angle value to personnel on an aircraft flight deck. This activity, while important to the flight of the aircraft for purposes of navigation and the reliability of the autopilot system, can pose a danger to the personnel of falling or sustaining other injuries.

Therefore, it would be desirable to have a system and method that takes into account at least some of the issues discussed above, as well as other possible issues.

BRIEF SUMMARY

Example implementations of the present disclosure are directed to calibration systems and methods for aircraft control surface actuation. A combination of components may be implemented to achieve an automated approach to performing calibration activities. The use of non-permanent gauges (inclinometers connected to adapters) may be affixed to the aircraft control surfaces and a low-power mesh network may be created around the aircraft as the gauges power-on. In this manner, the gauges may be considered network nodes and the gauges may transmit measurement data as appropriate (e.g., to a computing device, to a flight deck).

Multiple, automated measurement and adjustment cycles can be completed within the closed-loop calibration system to rapidly iterate and achieve calibrated control surface values. The gauge measurements may stream from the control surface to a computing device and/or the flight deck. Or the computing device or a flight deck controller may trigger the gauges remotely for a reading. The decision on which approach to use may be affected by the particular environment, network data throughput, optimal battery life, and overall frequency of data samples.

The present disclosure thus includes, without limitation, the following example implementations.

Some example implementations provide a method of calibration for actuation of an aircraft control surface, comprising: providing measurement data by an inclinometer coupled to the aircraft control surface, the measurement data comprising an inclination value corresponding to an angle at which the aircraft control surface is deflected; receiving the measurement data at an adapter with a wireless transmitter module and an interface connector connected to the inclinometer; wirelessly transmitting the measurement data by the wireless transmitter module; receiving the measurement data at a wireless receiver device having a port connector via which the wireless receiver device is connected to a computing device that thereby also receives the measurement data; and determining by the computing device if the measured inclination value corresponding to the angle at which the aircraft control surface is deflected differs by more than a predetermined amount from a directed deflection angle for the aircraft control surface, and responsively communicating an adjustment amount to a controller that directs deflection of the aircraft control surface, based on the difference between the measured inclination value and directed deflection angle for the aircraft control surface.

In some example implementations of the method of any preceding example implementation, or any combination of any preceding example implementations, the controller is a flight control computer and the computing device is a tablet computer, and the method further comprises generating by the tablet computer an output signal communicating the adjustment amount to the flight control computer to cause the flight control computer to alter a control signal to an actuator for deflecting the aircraft control surface based on the adjustment amount.

In some example implementations of the method of any preceding example implementation, or any combination of any preceding example implementations, the tablet computer includes a user-interface application configured to display the inclination value corresponding to the angle at which the aircraft control surface is deflected, and to wirelessly transmit the inclination value to the flight control computer.

In some example implementations of the method of any preceding example implementation, or any combination of any preceding example implementations, the controller is a flight control computer, and the method further comprises generating by the computing device a display of instructions that communicates the adjustment amount to be entered into the flight control computer via a user interface, to cause the flight control computer to alter a control signal to an actuator for deflecting the aircraft control surface based on the adjustment amount.

In some example implementations of the method of any preceding example implementation, or any combination of any preceding example implementations, the controller is a flight control computer and the computing device is a component onboard an aircraft flight deck, and the method further comprises generating by the computing device an output signal communicating the adjustment amount to the flight control computer, to cause the flight control computer to alter a control signal to an actuator for deflecting the aircraft control surface based on the adjustment amount.

In some example implementations of the method of any preceding example implementation, or any combination of any preceding example implementations, the inclinometer is a digital inclinometer and the wireless transmitter module is a radio frequency (RF) transceiver module.

In some example implementations of the method of any preceding example implementation, or any combination of any preceding example implementations, the RF transceiver module is configured to transmit wireless signals meeting wireless standard 802.15.4.

In some example implementations of the method of any preceding example implementation, or any combination of any preceding example implementations, the interface connector is one of an RS-232 connector, a serial port connector, or a USB connector.

In some example implementations of the method of any preceding example implementation, or any combination of any preceding example implementations, receiving the measurement data comprises receiving a continuous data stream of the measurement data from the inclinometer via the interface connector.

In some example implementations of the method of any preceding example implementation, or any combination of any preceding example implementations, receiving the measurement data comprises receiving a continuous data stream of the measurement data of the inclination value corresponding to the angle at which the aircraft control surface is deflected, and wirelessly transmitting the measurement data comprises wirelessly transmitting the continuous data stream of the measurement data.

In some example implementations of the method of any preceding example implementation, or any combination of any preceding example implementations, the method further comprises remotely reading measurement data of inclination values of the angle at which the aircraft control surface is deflected without requiring maintenance personnel on an actively deflected aircraft control surface.

Some example implementations provide an apparatus for calibration for actuation of an aircraft control surface, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for calibration for actuation of an aircraft control surface, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3A:
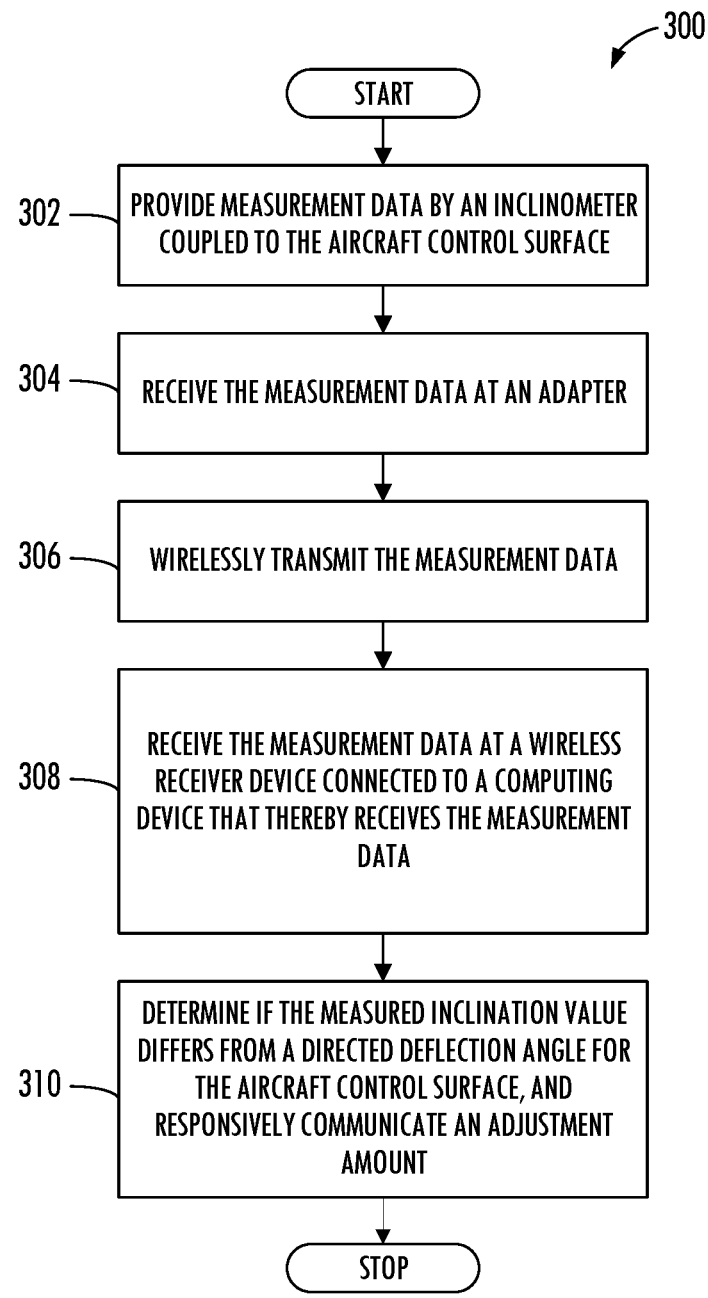
Figure 3B:
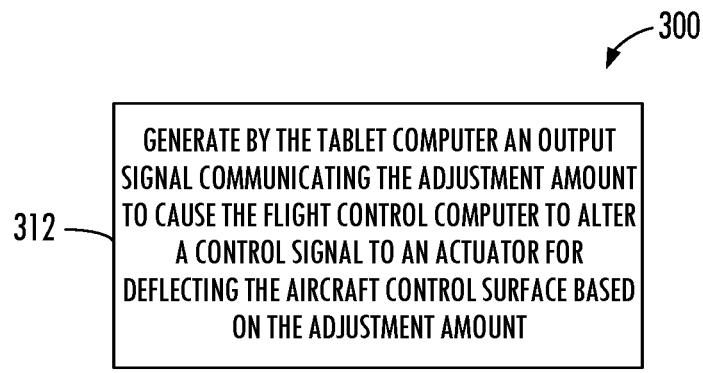
Figure 3C:
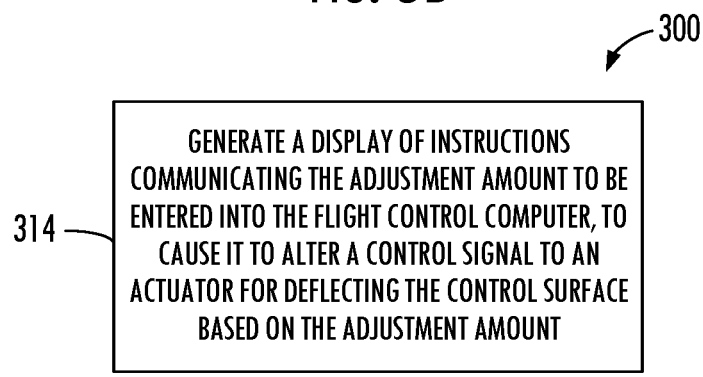
Figure 3D:
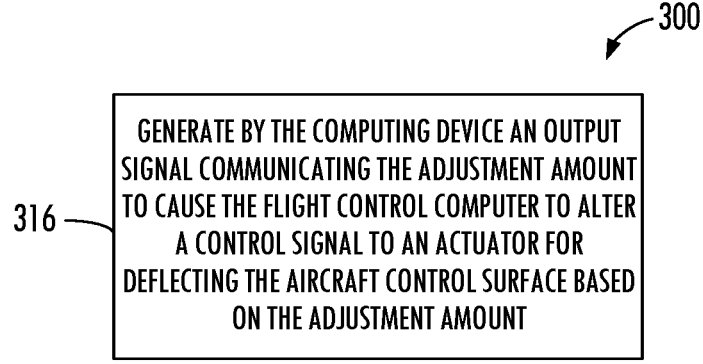
Figure 3E:
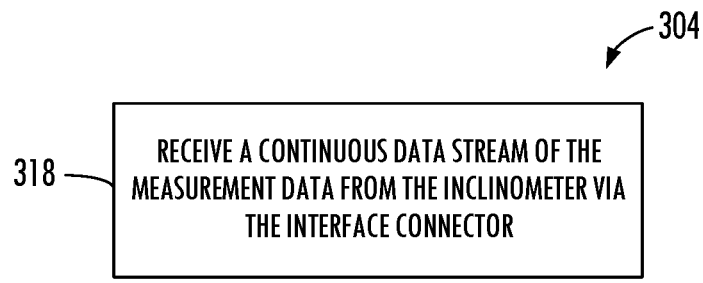
Figure 3F:
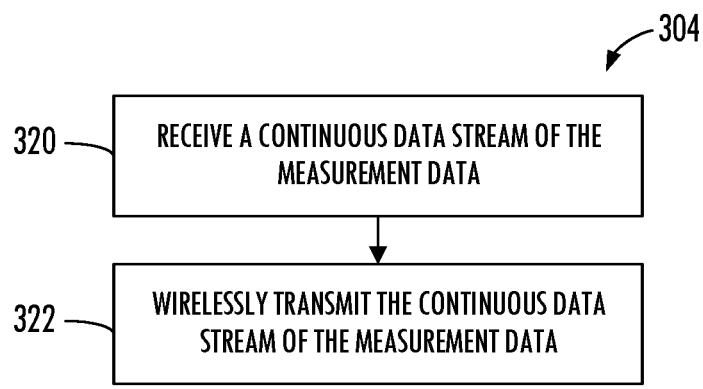
Figure 3G:
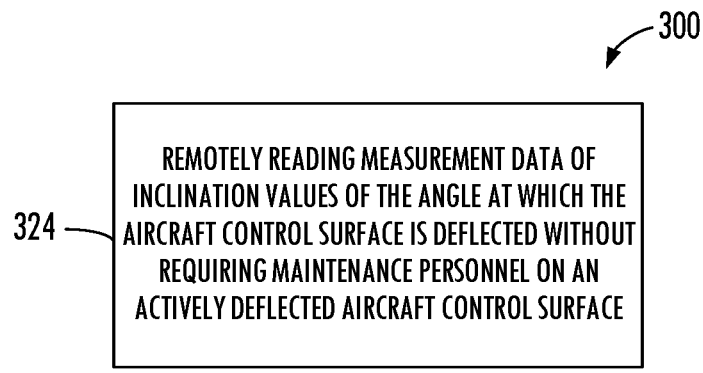
Figure 4:
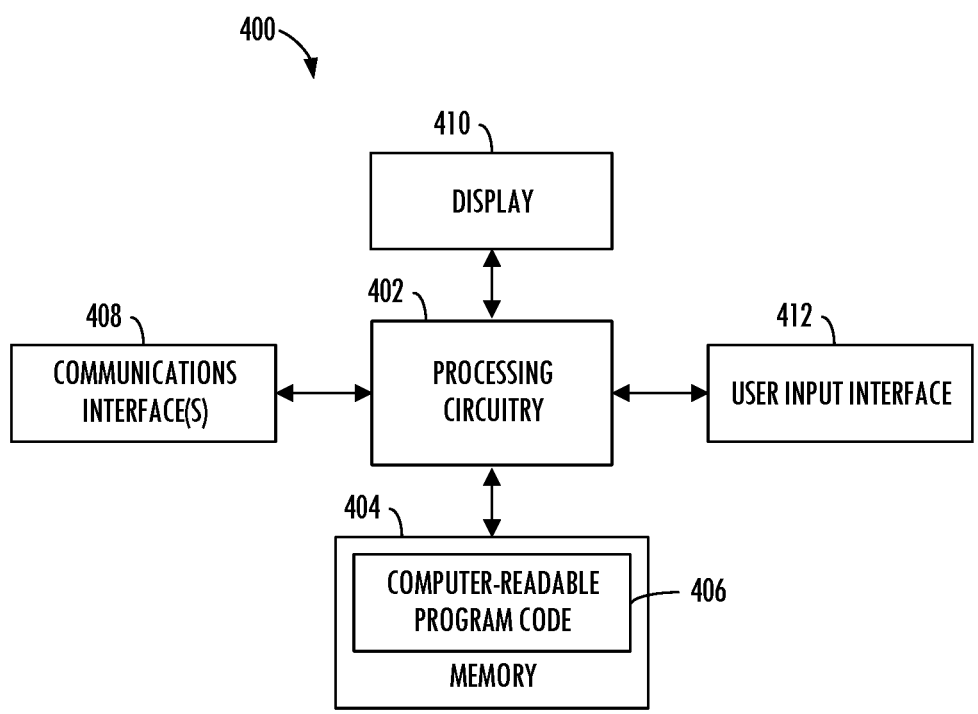

FIGS. 3A, 3B, 3C, 3D, 3E, 3F, and 3G are flowcharts illustrating various steps in a method of calibration for actuation of an aircraft control surface, according to example implementations; and FIG. 4 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to calibration systems and methods for aircraft control surface actuation. Inclinometers may be affixed to the control surface when maintenance calibration is needed. A low-power mesh network, with the inclinometers (connected to adapters) as network nodes, may then be created around the aircraft as the inclinometers power-on. The destination of the control surface network nodes may be a computing device acting as a network coordinator or receiver. The computing device may be a remote device or may be a component on the flight deck. The inclinometers can usually transmit directly to the computing device, but if the need arises, measurements can be routed through other network nodes to reach the computing device and eventually the flight deck. Once the measurement data reaches the flight deck, the data may be used for adjustment or calibration of the angle values of the aircraft control surfaces. The features described herein may be beneficial for improving the efficiency and safety of performing calibration for actuation of aircraft control surfaces.

Figure 1:
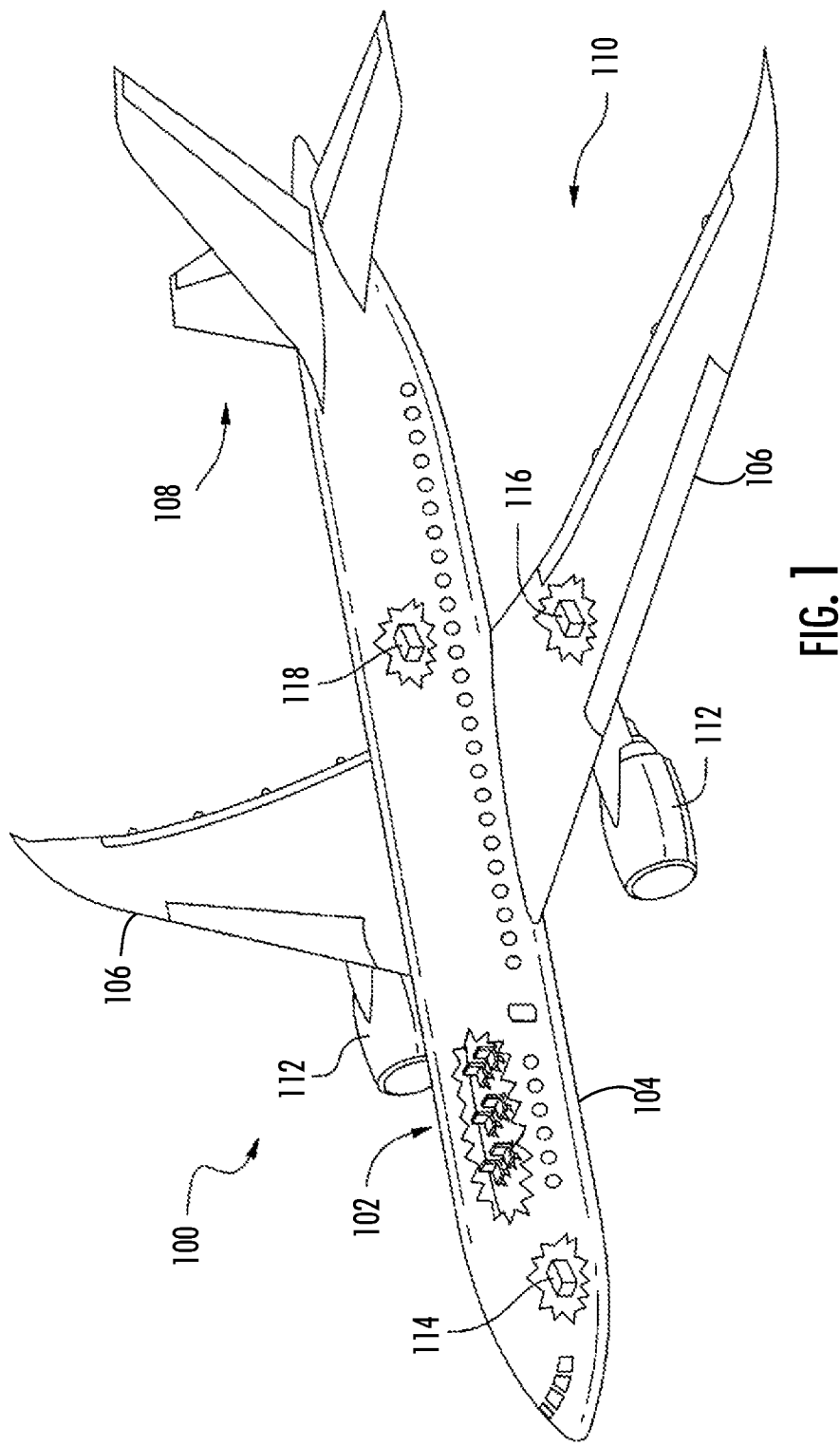
FIG. 1 illustrates an aircraft according to some example implementations of the present disclosure.

FIG. 1 illustrates one type of aircraft 100 that may benefit from example implementations of the present disclosure. Although, the systems and methods described herein may be implemented in other environments or on other machinery. As shown, the aircraft includes an airframe 102 with a fuselage 104, wings 106 and tail 108. The airframe or portions thereof, such as moveable ailerons, spoilers, or flaps on wings 106, may be referred to as an aircraft control surface, according to example implementations of the present disclosure. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
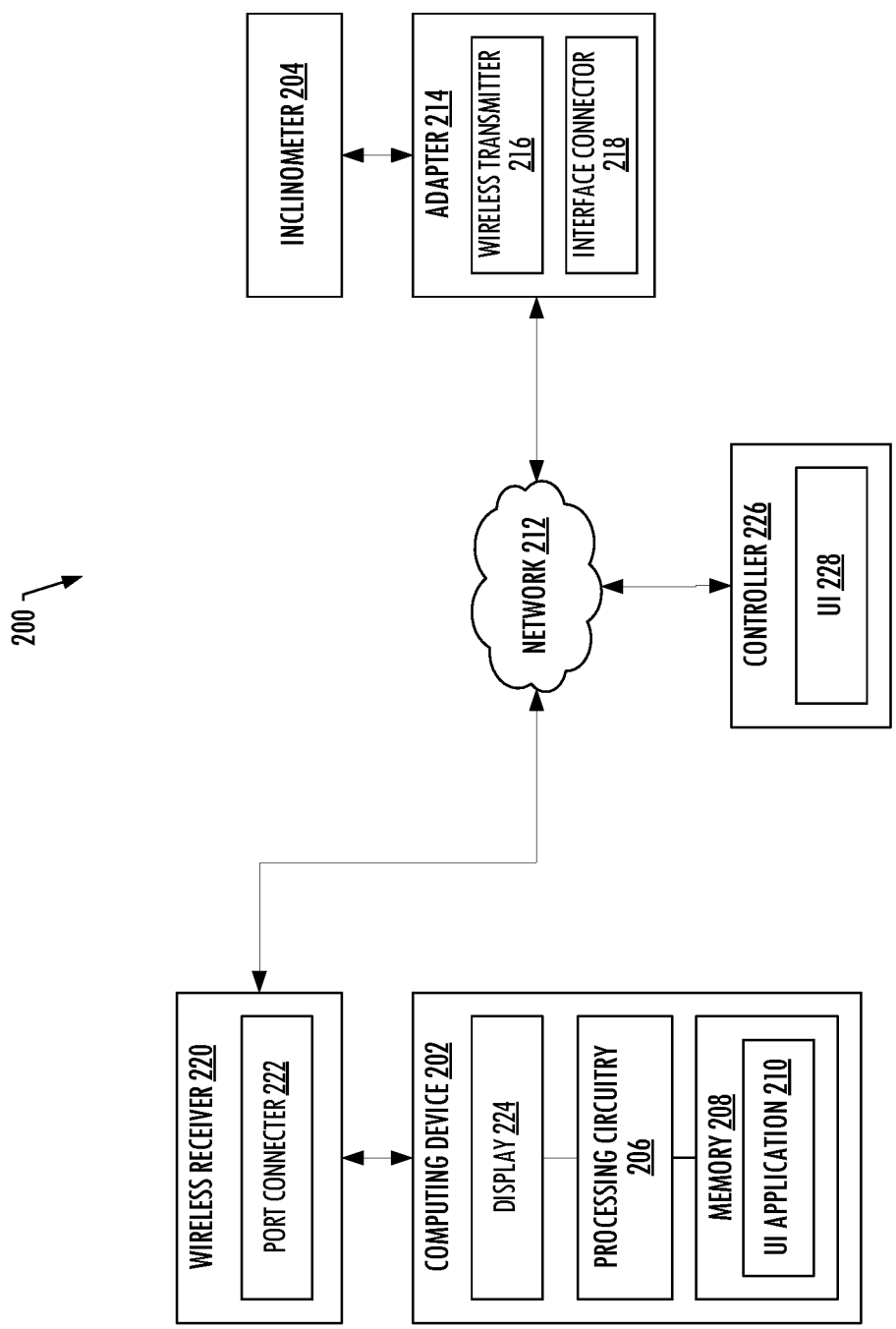
FIG. 2 illustrates a calibration system for aircraft control surface actuation, according to example implementations of the present disclosure.

FIG. 2 illustrates a calibration system 200 for actuation of an aircraft control surface such as a portion of airframe 102 (i.e., any portion of fuselage 104, wings 106 and movable ailerons, spoilers, and flaps thereon, and/or tail 108 and elevator surfaces thereon), according to example implementations of the present disclosure. The system may include any of a number of different subsystems (each an individual system) for performing one or more functions or operations. As shown, in some examples, the system includes a computing device 202 and an inclinometer 204. As also shown, the computing device includes processing circuitry 206, and memory 208 storing computer-readable program code for a user interface application 210. The subsystems may be operatively coupled to one another by various mechanisms. In some examples, various ones of the subsystems may communicate with one another across one or more computer networks 212. Further, although shown as part of the system 200, it should be understood that any one or more of the above may function or operate as a separate system without regard to any of the other subsystems. It should also be understood that the system may include one or more additional or alternative subsystems than those shown in FIG. 2.

According to example implementations of the present disclosure, the inclinometer 204, which may be a digital inclinometer, is coupleable to an aircraft control surface, such as a movable flap, for example. An example inclinometer that may be suitable for example implementations described herein is Mitutoyo Digital Protractor 950-318. The inclinometer may be configured to provide measurement data of an inclination value corresponding to an angle at which the aircraft control surface is deflected. As shown, the system includes an adapter 214 with a wireless transmitter module 216, which may be a radio frequency (RF) transceiver module, and an interface connector 218 connected to the inclinometer. In some of these examples, the RF transceiver module is configured to transmit wireless signals meeting wireless standard 802.15.4, and the interface connector is one of an RS-232 connector, a serial port connector, or a USB connector. An example RF transceiver module that may be suitable for example implementations described herein is Digi XBee-Pro S2C.

The adapter 214 may be configured to receive the measurement data of the inclination value corresponding to the angle that the aircraft control surface is deflected. The adapter may also be configured to wirelessly transmit the measurement data. As also shown, the system 200 includes a wireless receiver device 220 having a port connector 222, and the computing device 202 connected to the wireless receiver device via the port connector to receive the measurement data. In some examples, the adapter may communicate with the computing device and/or a flight deck of the aircraft to transmit the measurement data.

In some examples, a mesh network is formed by a plurality of adapters 214 on the aircraft control surfaces. In situations where wireless transmission from one of the plurality of adapters is hindered, e.g., due to signal loss or interference, instead of the hindered adapter transmitting to the computing device 202 or the flight deck, the hindered adapter may transmit its measurement data to a nearby adapter, which may forward the measurement data accordingly. In this manner, the plurality of adapters act as network nodes capable of transmitting their own measurement data and also forwarding data from other network nodes as needed to overcome issues that may be encountered by a hindered adapter during its transmission.

Returning to FIG. 2, in some examples the computing device 202 includes processing circuitry 206, memory 208 storing computer-readable program code for a user interface application 210, and a display 224. In some examples, the computing device is configured to determine if the inclination value corresponding to the angle at which the aircraft control surface is deflected differs by more than a predetermined amount from a directed deflection angle for the aircraft control surface. Accordingly, the computing device may be configured to responsively communicate an adjustment amount to a controller 226. The controller may be configured to direct deflection of the aircraft control surface based on the difference between the measured inclination value and the directed deflection angle for the aircraft control surface.

In some examples, the system 200 further comprises the controller 226 that is a flight control computer, and the computing device 202 is a tablet computer. In these examples, the tablet computer is configured to generate an output signal to communicate the adjustment amount to the flight control computer to cause the flight control computer to alter a control signal to an actuator (not shown) for deflecting the aircraft control surface based on the adjustment amount. The tablet computer may include a user-interface application 210 configured to display, on display 224, the inclination value corresponding to the angle at which the aircraft control surface is deflected, and also configured to wirelessly transmit the inclination value to the aircraft's flight control computer.

In some examples, the system 200 further comprises the controller 226 that is a flight control computer. In these examples, the computing device 202 is configured to generate a display of instructions, on display 224, that communicates the adjustment amount to be entered into the flight control computer via a user interface 228, to cause the flight control computer to alter a control signal to an actuator for deflecting the aircraft control surface based on the adjustment amount.

The system further comprises, in some examples, the controller 226 that is a flight control computer, and the computing device 202 is a component onboard an aircraft flight deck (not shown). In these examples, the computing device is configured to generate an output signal to communicate the adjustment amount to the flight control computer, to cause the flight control computer to alter a control signal to an actuator for deflecting the aircraft control surface based on the adjustment amount.

In some examples, the adapter 214 is configured to receive a continuous data stream of the measurement data of the inclination value corresponding to the angle at which the aircraft control surface is deflected from the inclinometer 204 via the interface connector 218. And the adapter may be configured to wirelessly transmit via the wireless transmitter module 216 the continuous data stream of the measurement data.

In some examples, the system 200 enables remotely reading measurement data of inclination values of the angle at which the aircraft control surface is deflected without requiring maintenance personnel on an actively deflected aircraft control surface. This may increase the efficiency of set up and use of the calibration system, as well as improve the safety by allowing personnel to remotely read an inclinometer(s) rather than being required to be physically on an actively deflected aircraft control surface.

FIG. 3A is a flowchart illustrating various steps in a method 300 of calibration for actuation of an aircraft control surface, according to example implementations of the present disclosure. As shown at block 302, the method includes providing measurement data by an inclinometer 204 coupled to the aircraft control surface. As shown at block 304, the method also includes receiving the measurement data at an adapter 214 with a wireless transmitter module 216 and an interface connector 218 connected to the inclinometer.

As shown at blocks 306 and 308, the measurement data is wirelessly transmitted by the wireless transmitter module 216, and the measurement data is received at a wireless receiver device 220 having a port connector 222. Via the port connector, the wireless receiver device is connected to a computing device 202 that thereby also receives the measurement data.

As shown at block 310, the computing device determines if the measured inclination value corresponding to the angle at which the aircraft control surface is deflected differs by more than a predetermined amount from a directed deflection angle for the aircraft control surface. The computing device thereby responsively communicates an adjustment amount to a controller 226 that directs deflection of the aircraft control surface, based on the difference between the measured inclination value and directed deflection angle for the aircraft control surface.

In some examples in which the controller 226 is a flight control computer and the computing device 202 is a tablet computer, the method 300 further comprises generating by the tablet computer an output signal communicating the adjustment amount to the flight control computer, as shown at block 312 of FIG. 3B. This may cause the flight control computer to alter a control signal to an actuator for deflecting the aircraft control surface based on the adjustment amount.

In some examples in which the controller 226 is a flight control computer, the method 300 further comprises generating by the computing device 202 a display of instructions, as shown at block 314 of FIG. 3C. The display of instructions may communicate the adjustment amount to be entered into the flight control computer via a user interface 228, to cause the flight control computer to alter a control signal to an actuator for deflecting the aircraft control surface based on the adjustment amount.

In some examples in which the controller 226 is a flight control computer and the computing device 202 is a component onboard an aircraft flight deck, the method 300 further comprises generating by the computing device an output signal communicating the adjustment amount to the flight control computer, as shown at block 316 of FIG. 3D. This may cause the flight control computer to alter a control signal to an actuator for deflecting the aircraft control surface based on the adjustment amount.

In some examples, receiving the measurement data at block 304 comprises receiving, from the inclinometer 204 via the interface connector 218, a continuous data stream of the measurement data of the inclination value corresponding to the angle at which the aircraft control surface is deflected, as shown at block 318 of FIG. 3E.

As shown at blocks 320 and 322 of FIG. 3F, in some examples, receiving the measurement data at block 304 comprises receiving a continuous data stream of the measurement data, and wirelessly transmitting the measurement data at block 306 comprises wirelessly transmitting the continuous data stream of the measurement data.

In some examples, the method 300 further comprises remotely reading measurement data of inclination values of the angle at which the aircraft control surface is deflected without requiring maintenance personnel on an actively deflected aircraft control surface, as shown at block 324 of FIG. 3G.

According to example implementations of the present disclosure, the system 200 and its subsystems including computing device 202 and inclinometer 204 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 4 illustrates an apparatus 400, which may correspond to computing device 202 of system 200 shown in FIG. 2, according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device). The processing circuitry may correspond to processing circuitry 206 and memory 404 may correspond to memory 208, as shown in computing device 202 of system 200 in FIG. 2.

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may store computer-readable program code corresponding to computer-readable program code for a user interface application 210, as shown in FIG. 2. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410, which may correspond to display 224 in computing device 202, and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A calibration system for aircraft control surface actuation, comprising:
    an inclinometer coupleable to an aircraft control surface, configured to provide measurement data of an inclination value corresponding to an angle at which the aircraft control surface is deflected;
    an adapter with a wireless transmitter module and an interface connector connected to the inclinometer, the adapter configured to receive the measurement data of the inclination value corresponding to the angle that the aircraft control surface is deflected, and to wirelessly transmit the measurement data;
    a wireless receiver device having a port connector; and
    a computing device connected to the wireless receiver device via the port connector to receive the measurement data,
    the computing device configured to determine if the inclination value corresponding to the angle at which the aircraft control surface is deflected differs by more than a predetermined amount from a directed deflection angle for the aircraft control surface, and the computing device is configured to responsively communicate an adjustment amount to a controller, wherein the controller is configured to direct deflection of the aircraft control surface, based on the difference between the measured inclination value and the directed deflection angle for the aircraft control surface.

2. The system of claim 1, wherein the system further comprises the controller that is a flight control computer, and the computing device is a tablet computer configured to generate an output signal to communicate the adjustment amount to the flight control computer to cause the flight control computer to alter a control signal to an actuator for deflecting the aircraft control surface based on the adjustment amount.

3. The system of claim 2, wherein the tablet computer includes a user-interface application configured to display the inclination value corresponding to the angle at which the aircraft control surface is deflected, and to wirelessly transmit the inclination value to the flight control computer.

4. The system of claim 1, wherein the system further comprises the controller that is a flight control computer, and the computing device is configured to generate a display of instructions that communicates the adjustment amount to be entered into the flight control computer via a user interface, to cause the flight control computer to alter a control signal to an actuator for deflecting the aircraft control surface based on the adjustment amount.

5. The system of claim 1, wherein the system further comprises the controller that is a flight control computer, and the computing device is a component onboard an aircraft flight deck and is configured to generate an output signal to communicate the adjustment amount to the flight control computer, to cause the flight control computer to alter a control signal to an actuator for deflecting the aircraft control surface based on the adjustment amount.

6. The system of claim 1, wherein the inclinometer is a digital inclinometer and the wireless transmitter module is a radio frequency (RF) transceiver module is configured to transmit wireless signals meeting wireless standard 802.15.4.

7. The system of claim 1, wherein the interface connector is one of an RS-232 connector, a serial port connector, or a USB connector.

8. The system of claim 1, wherein the adapter is configured to receive a continuous data stream of the measurement data from the inclinometer via the interface connector.

9. The system of claim 1, wherein the adapter is configured to receive a continuous data stream of the measurement data of the inclination value corresponding to the angle at which the aircraft control surface is deflected, and to wirelessly transmit via the wireless transmitter module the continuous data stream of the measurement data.

10. The system of claim 1, wherein the system enables remotely reading measurement data of inclination values of the angle at which the aircraft control surface is deflected without requiring maintenance personnel on an actively deflected aircraft control surface.

11. A method of calibration for actuation of an aircraft control surface, comprising:
    providing measurement data by an inclinometer coupled to the aircraft control surface, the measurement data comprising an inclination value corresponding to an angle at which the aircraft control surface is deflected;
    receiving the measurement data at an adapter with a wireless transmitter module and an interface connector connected to the inclinometer;
    wirelessly transmitting the measurement data by the wireless transmitter module;
    receiving the measurement data at a wireless receiver device having a port connector via which the wireless receiver device is connected to a computing device that thereby also receives the measurement data;
    determining by the computing device if the measured inclination value corresponding to the angle at which the aircraft control surface is deflected differs by more than a predetermined amount from a directed deflection angle for the aircraft control surface;
    responsively communicating, via the computing device, an adjustment amount to a controller; and
    directing deflection of the aircraft control surface, via the controller, based on the difference between the measured inclination value and directed deflection angle for the aircraft control surface.

12. The method of claim 11, wherein the controller is a flight control computer and the computing device is a tablet computer, and
    wherein the method further comprises generating by the tablet computer an output signal communicating the adjustment amount to the flight control computer to cause the flight control computer to alter a control signal to an actuator for deflecting the aircraft control surface based on the adjustment amount.

13. The method of claim 12, wherein the tablet computer includes a user-interface application configured to display the inclination value corresponding to the angle at which the aircraft control surface is deflected, and to wirelessly transmit the inclination value to the flight control computer.

14. The method of claim 11, wherein the controller is a flight control computer, and
wherein the method further comprises generating by the computing device a display of instructions that communicates the adjustment amount to be entered into the flight control computer via a user interface, to cause the flight control computer to alter a control signal to an actuator for deflecting the aircraft control surface based on the adjustment amount.

15. The method of claim 11, wherein the controller is a flight control computer and the computing device is a component onboard an aircraft flight deck, and
wherein the method further comprises generating by the computing device an output signal communicating the adjustment amount to the flight control computer, to cause the flight control computer to alter a control signal to an actuator for deflecting the aircraft control surface based on the adjustment amount.

16. The method of claim 11, wherein the inclinometer is a digital inclinometer and the wireless transmitter module is a radio frequency (RF) transceiver module configured to transmit wireless signals meeting wireless standard 802.15.4.

17. The method of claim 11, wherein the interface connector is one of an RS-232 connector, a serial port connector, or a USB connector.

18. The method of claim 11, wherein receiving the measurement data comprises receiving a continuous data stream of the measurement data from the inclinometer via the interface connector.

19. The method of claim 11, wherein receiving the measurement data comprises receiving a continuous data stream of the measurement data of the inclination value corresponding to the angle at which the aircraft control surface is deflected, and wirelessly transmitting the measurement data comprises wirelessly transmitting the continuous data stream of the measurement data.

20. The method of claim 11, further comprising remotely reading measurement data of inclination values of the angle at which the aircraft control surface is deflected without requiring maintenance personnel on an actively deflected aircraft control surface.

21. The system of claim 1, wherein the adapter is further defined as a plurality of adapters, and the inclinometer is further defined as a plurality of inclinometers, wherein a respective one of the adapters are connected to a respective one of the inclinometers, and the inclinometers are non-permanent gauges selectively affixed to the aircraft control surface, and wherein a low-power mesh network is formed, via the inclinometers connected to the adapters as network nodes, when the inclinometers are powered on.

22. The method of claim 11, wherein the adapter is further defined as a plurality of adapters and the inclinometer is further defined as a plurality of inclinometers, wherein a respective one of the adapters are connected to a respective one of the inclinometers, wherein the adapters are configured to receive the measurement data from the respective inclinometers, and the method further comprises:
transmitting the measurement data from one of the adapters to another one of the adapters when the one of the adapters is hindered.

* * * * *